Aug. 15, 1961     G. P. FLAGSTAD     2,995,860
FISHHOOK EXTRACTING TOOL
Filed Dec. 16, 1958
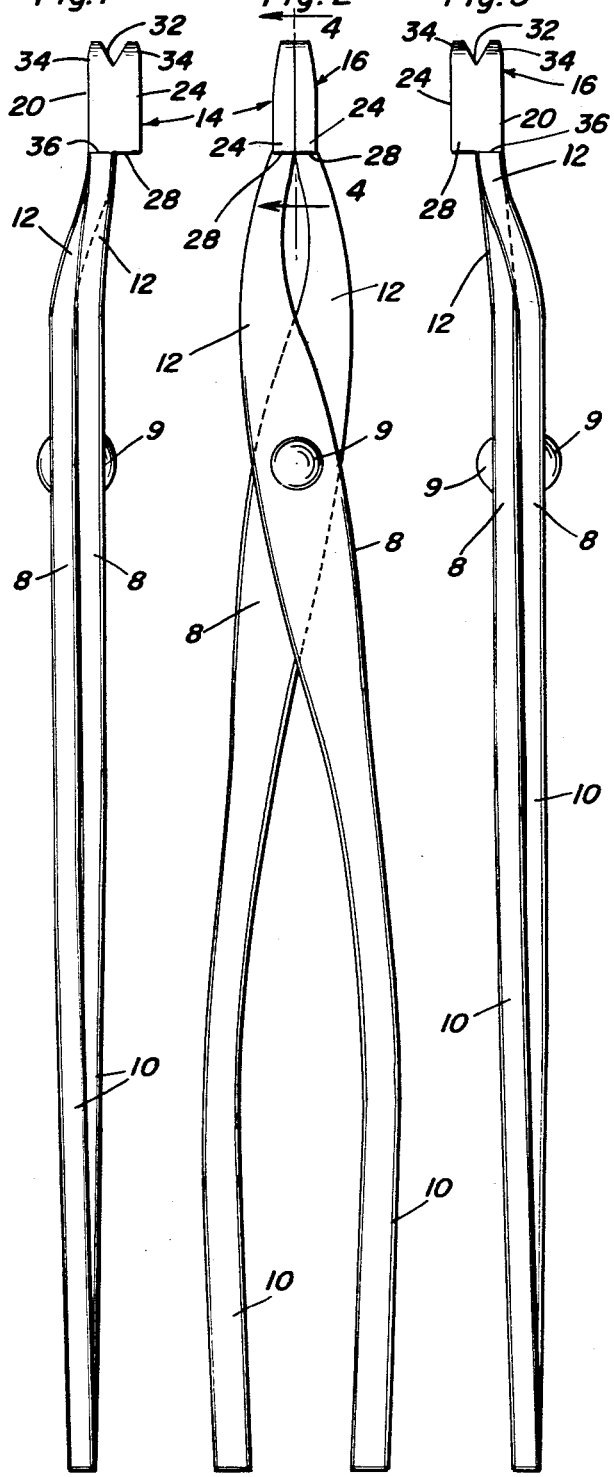
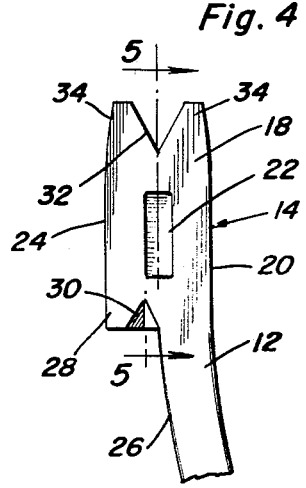
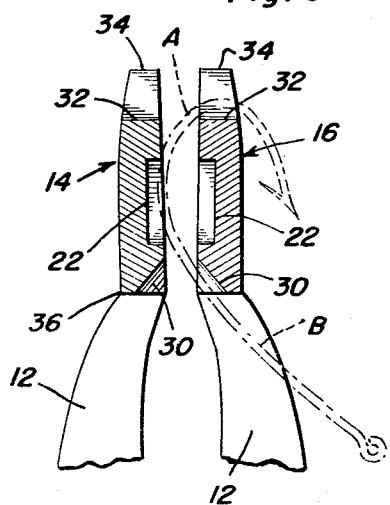
George P. Flagstad
INVENTOR.
BY Clarence A. O'Brien
and Harvey B. Jackson
Attorneys

United States Patent Office 2,995,860
Patented Aug. 15, 1961

2,995,860
FISHHOOK EXTRACTING TOOL
George P. Flagstad, Wyndmere, N. Dak.
Filed Dec. 16, 1958, Ser. No. 780,847
4 Claims. (Cl. 43—53.5)

The present invention pertains to a tool or implement for use by fishermen and relates specifically to pliers adapted for according the user a firm and reliable grip on an embedded fishhook for removing the fishhook.

Tools and implements for loosening and withdrawing a fishhook from the mouth of a fish are not new. On the contrary many and varied styles and forms of tools including a pliers type, have been devised to assist fishermen in catching hold of and readily extracting the fishhook without objectionable damage to the fishhook or the portion of the mouth of the fish involved.

Objects of this invention are to provide an improved pliers-like tool having cooperating jaws. The adjacent or opposed interior surfaces with pocket-like recesses to provide for limited clearance of the portion of the shank at the juncture of the shank and the usual arcuate bend of the hook.

The respective outer or tip ends of the jaws are bifurcated and the furcations provide selectively usable pressure exerting and hook dislodging prongs.

In addition each jaw is formed with a limited portion which projects beyond the part of the lever carrying it and this projecting portion is provided with a V-shaped or an equivalently formed notch which also cooperates with the other components in more effectually accommodating the portions of the conventional fishhook and promotes cooperation of the same with the fishhook.

With the above and other objects in view, the invention resides in the novel features of construction fully described in the specification and more particularly defined by the appended claims.

In the drawing:

FIG. 1 is a side elevational view of a tool or implement used as a fishhook extractor and constructed in accordance with the invention.

FIG. 2 is a front elevational view of the tool of FIG. 1.

FIG. 3 is a side elevational view observing the reverse side of the jaws compared to the position of the same seen in FIG. 1.

FIG. 4 is a view of a fragmentary view on the line 4—4 of FIG. 2 and on an enlarged scale.

FIG. 5 is a section taken on the approximate plane of the line 5—5 but showing the jaws in cooperating relationship.

The pliers have companion cooperating portions 8 which overlap and are pivoted or hinged together as at 9. The handle portions are substantially conventional as at 10 but may be either long or short depending on the leverage needed. The outer or forward end portions are denoted by the numeral 12 and the terminal part of each terminates in a substantially rectangular or block-like jaw. Actually the jaws are substantially the same in construction but for conveniece one jaw may be identified by the numeral 14 and the other one with the numeral 16. As seen in FIG. 4 the inner face 18 is substantially flat. One edge 20 of the jaw is a continuation of and therefore in line with a cooperating lengthwise edge of the jaw portion 12. The median part of the face has a substantially rectangular pocket or recess 22 therein which in the manner shown in FIG. 5 serves to accommodate the bend or curvature A at the outer end of the shank portion B of the fishhook, this being a conventional fishhook. The edge portion 24 projects beyond the corresponding edge portion 26 of the lever and defines an overhanging or projecting corner 28 which has a substantially V-shaped notch or recess 30 formed therein somewhat in line with the elongated pocket 22. The outer end of the jaw is bifurcated as at 32 forming a crotch and also a pair of spaced prongs 34 which are of duplicate construction. There is also a slight bend at 36 where the jaw joins with the lever-end 12. This is believed to be necessary so that actually when the jaws are closed they are flat and firm with their inner surfaces or faces 18 in rigid contact.

As is evident the tool shown and described effectually serves the purpose of removing a fishhook from the mouth of a fish when the hook has become embedded or is lodged in place in such manner as to interfere with easy or ready removal. The V-shaped crotches in the nose or outer end of the jaws have been found to be highly efficient in contributing their proportionate share in the gripping and removal step as is evident from the dotted line showing seen in the drawing. To operate it is advisable to work the instrument on the hook so that the hook fits into the V-groove and then thrust the instrument down on the hook until the V-groove fits the curve or bend of the fishhook and the prongs or furcations straddle the same. Then clamp the jaws tightly together and it becomes possible to twist and manipulate the tool and hook so that it can be dislodged and then extracted. It is advisable to hold the fish by the back of the head and the instrument can be easily inserted into the mouth. The reason the jaws or nose of the instrument are offset or bent about thirty degrees is to allow the end of the hook with the line attached to extend through the gap or center opening thus eliminating much chance of damaging the hook. The tool is effective for both single and treble hooks and makes it possible to remove the hook with a minimum of damage to the fish.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishhook dislodging and extracting tool comprising crossed pivotally connected handles having cooperating jaws, each jaw having a bifurcated distal end portion and a proximal end portion, said bifurcated end portion defining a pair of coplanar duplicate furcations of pronglike form, said proximal end portion having a shallow V-shaped notch therein, said jaws having opposed clamping surfaces, the vertex of said V-shaped notch being directed at an acute angle to the clamping surfaces of its jaw, said opposed clamping surfaces having complementary elongated recesses defining therein a clearance pocket, said furcations, notch and recess of each jaw being in substantial alignment whereby a fishhook can be held with portions of the fishhook being received in said furcations, recess and notch.

2. The combination of claim 1 wherein the clamping surfaces of said jaws are substantially rectangular, the ends of said recesses being spaced from the adjacent ends of said furcations and notches.

3. The combination of claim 1 wherein said recesses are of less width than the distance between the terminal portions of said furcations.

4. The combination of claim 1 wherein said jaws project laterally from one side of their handles.

References Cited in the file of this patent
UNITED STATES PATENTS

| | | |
|---|---|---|
| 97,399 | Holmes | Nov. 30, 1869 |
| 1,619,400 | Briggs | Mar. 1, 1927 |
| 2,654,632 | Herbert | Oct. 6, 1953 |
| 2,779,123 | White | Jan. 29, 1957 |
| 2,842,997 | Wentling | July 15, 1958 |